United States Patent
Lutz

(10) Patent No.: US 8,880,994 B1
(45) Date of Patent: Nov. 4, 2014

(54) SYSTEM AND METHOD FOR ANNOTATING AND MANIPULATING ELECTRONIC DOCUMENTS

(71) Applicant: David Lutz, Bloomfield Hills, MI (US)

(72) Inventor: David Lutz, Bloomfield Hills, MI (US)

(73) Assignee: E-Z Brief LLC, Bloomfield Hills, MI (US)

(*) Notice: Subject to any disclaimer, the term of this patent is extended or adjusted under 35 U.S.C. 154(b) by 0 days.

(21) Appl. No.: 13/871,313

(22) Filed: Apr. 26, 2013

Related U.S. Application Data

(63) Continuation of application No. 13/866,800, filed on Apr. 19, 2013.

(51) Int. Cl.
    *G06F 17/00*     (2006.01)
    *G06F 17/24*     (2006.01)
    *G06F 17/21*     (2006.01)

(52) U.S. Cl.
    CPC ............ *G06F 17/241* (2013.01); *G06F 17/211* (2013.01); *G06F 17/24* (2013.01)
    USPC ........... 715/230; 715/200; 715/231; 715/233; 715/273; 715/255

(58) Field of Classification Search
    CPC ...... G06F 17/211; G06F 17/24; G06F 17/241
    USPC .......... 715/200, 230, 231, 233, 209, 273, 255
    See application file for complete search history.

(56) References Cited

U.S. PATENT DOCUMENTS

| | | | |
|---|---|---|---|
| 5,339,392 A * | 8/1994 | Risberg et al. ................ | 715/762 |
| 6,356,922 B1 * | 3/2002 | Schilit et al. .................. | 715/236 |
| 6,519,603 B1 | 2/2003 | Bays et al. | |
| 6,721,921 B1 | 4/2004 | Altman | |
| 6,769,096 B1 * | 7/2004 | Kuppusamy et al. ......... | 715/234 |
| 6,820,237 B1 | 11/2004 | Abu-Hakima et al. | |
| 7,299,407 B2 * | 11/2007 | Joshi et al. .................... | 715/205 |
| 7,370,269 B1 * | 5/2008 | Prabhu et al. ................. | 715/230 |
| 7,496,841 B2 * | 2/2009 | Hadfield et al. .............. | 715/255 |
| 7,496,856 B2 * | 2/2009 | Beezer et al. ................. | 715/802 |
| 7,664,825 B2 * | 2/2010 | Yeung et al. .................. | 709/217 |
| 7,702,811 B2 * | 4/2010 | Gopalan et al. ............... | 709/245 |

(Continued)

FOREIGN PATENT DOCUMENTS

| | | | |
|---|---|---|---|
| EP | 0902379 A2 * | 3/1999 | |
| WO | WO 2005091165 A2 * | 9/2005 | |

*Primary Examiner* — William Bashore
*Assistant Examiner* — David Faber
(74) *Attorney, Agent, or Firm* — Aidenbaum Schloff and Bloom PLLC; Jay Schloff; Keith Schonberger

(57) ABSTRACT

A method, system, and computer program product allow a user to annotate and manipulate a plurality of electronic documents. The user loads a first electronic document comprising electronic content, which content may be annotated or otherwise manipulated by the user and which annotations are made using a user-defined indication means. The annotated content is outputted to a second electronic document, wherein the content is automatically organized into a corresponding grouping defined by a user-selected identifying aspect. The user may subsequently reorganize any of the outputted annotations within the second electronic document. The method, system, and computer program product further utilize a file browser within which a plurality of electronic documents may be organized and maintained by the user and a client-server protocol for communicating data between a remote database and a local storage medium.

17 Claims, 7 Drawing Sheets

(56) References Cited

U.S. PATENT DOCUMENTS

| | | | |
|---|---|---|---|
| 7,712,028 B2 * | 5/2010 | Kuruoglu et al. | 715/254 |
| 7,987,416 B2 | 7/2011 | Loeser et al. | |
| 8,255,819 B2 * | 8/2012 | Chang et al. | 715/769 |
| 8,276,061 B2 * | 9/2012 | Joshi et al. | 715/230 |
| 2004/0034832 A1 * | 2/2004 | Taylor et al. | 715/512 |
| 2004/0034835 A1 * | 2/2004 | Kuruoglu et al. | 715/530 |
| 2004/0255242 A1 * | 12/2004 | Price et al. | 715/512 |
| 2007/0266342 A1 * | 11/2007 | Chang et al. | 715/810 |
| 2009/0157811 A1 * | 6/2009 | Bailor et al. | 709/204 |
| 2011/0022941 A1 | 1/2011 | Osborne et al. | |
| 2011/0202825 A1 * | 8/2011 | Volsky | 715/230 |
| 2012/0320416 A1 * | 12/2012 | Mbenkum et al. | 358/1.15 |
| 2013/0042173 A1 * | 2/2013 | Habib et al. | 715/255 |
| 2013/0185622 A1 * | 7/2013 | Odean et al. | 715/230 |

\* cited by examiner

SYSTEM AND METHOD FOR ANNOTATING AND MANIPULATING ELECTRONIC DOCUMENTS

CROSS-REFERENCE TO RELATED APPLICATIONS

The present application is a continuation of and claims priority under 35 U.S.C. §120 on the pending U.S. patent application Ser. No. 13/866,800, filed on Apr. 19, 2013, the disclosure of which is incorporated by reference.

FIELD OF THE DISCLOSURE

The present disclosure relates to a system and method for annotating and manipulating electronic documents, and, more particularly, to a system and method for outputting and organizing user-annotated content from a first electronic document to a second electronic document.

BACKGROUND

Perusing large documents for content can be a tiring and stressful task. For instance, it is difficult for readers to maintain organized notes on lengthy passages, and it is particularly trying for readers to retain all of the necessary information within their memory. A reader may further need to organize his or her notes based on a particular category of content or set thereof and/or may instead be reading strictly for information pertaining to such categories. Even when a reader is successful in consuming the content of a document, reviewing the document and subsequently organizing a set of notes thereon requires a significant amount of time to accomplish. For instance, reading through a stack of legal court opinions or a movie production script and also tracking and organizing all of the relevant information from the document or documents is a trying endeavor that demands constant focus and a substantial amount of time to accomplish.

A traditional way to keep track of specific information in a document is to highlight a passage in color or to annotate passages of text or other content directly on the face of the document. Doing so directs the reader's attention back to the highlighted or annotated passages during a subsequent read-through, which makes it easy to quickly recall important facts. Additionally, today, highlighters are available in a plurality of colors, and when each such color is paired with its own category of information, it allows a reader to quickly reference specific (color-coded) categories of content. Readers may take this process a step further as well—by transposing the highlighted or annotated content from the original document onto a new document, and maintaining the transposed content in an organized, summarized manner on the new document. "Briefing" court opinions is a good example of this practice, which activity generally involves drafting a new document and organizing specific information therein into the categories to which it pertains, which new document may be used as a standalone reference or as a supplement to the original court opinion document.

However, while highlighting, or annotating, and transposing such content is generally a simple process with print documents, such as physical books and papers, it can be difficult and inefficient when attempted with electronic documents. That is, software applications generally do not provide an easy, convenient, and efficient way for users to highlight or annotate content on an electronic document, transpose that content to a new electronic document, and organize that content therein into categories or groupings based on the specific means by which the content was highlighted or annotated. Because our society is moving more towards electronic data and farther away from print, it is important that readers be able to easily and efficiently annotate content on a first electronic document, output the annotated content to a second electronic document, and organize the annotated content as desired within the second electronic document.

Solutions known in the art include the system and method disclosed in U.S. Pat. No. 6,721,921, wherein a user annotates a first electronic document and the system subsequently generates an exact copy of that document and the annotations made thereon. This technique creates a graphical overlay that can be disposed onto copies of the first electronic document, which overlays comprise the user's annotations exactly as they were made on the first document. However, this system and method does not actually output the annotated content from the original electronic document or allow the user to edit the first electronic document, and so the second electronic document created thereby does not help the user by including only the annotated content from the first electronic document or by organizing such content therein.

A second system and method for annotating the content of a first electronic document is disclosed in U.S. Pat. No. 7,987,416 and involves creating an output repository wherein records are maintained as to the identifying information of the first electronic document within which the annotations were made, which identifying information is predefined within a plurality of reusable operators. The operators search through the first electronic document for identifying information, which, when located, is annotated and outputted to the output repository. While this technique conveniently records and displays the annotations made to a first electronic document, it too fails to create an actual second electronic document that comprises the annotated content from the first electronic document or that organizes such content.

A third technique is disclosed in U.S. Pat. No. 6,519,603, which relies on a method for taking as input a first electronic document and a query of particularized content to be annotated, which method searches the first electronic document for such content, autonomously annotates it, and outputs the annotated content to a database or repository. This method overcomes the shortcomings of other techniques by outputting only the annotated content to the second electronic document, which second document is therefore a good resource for the user to review the annotated content itself. Still, this technique includes its own disadvantages, namely, that the process of annotating the first electronic document may be automated rather than done by the user, and, further, that the user is incapable of subsequently organizing the annotated content within the database or repository.

Consequently, there exists a need for a system and method that allows a user to annotate content on a first electronic document, output the annotated content to a second electronic document, and organize the annotated content as desired within the second electronic document into groupings defined by the content categories to which the annotated content pertains.

SUMMARY OF THE INVENTION

In view of the foregoing disadvantages of the prior art, a system and method for annotating, outputting, and organizing electronic content configured to include all the advantages of the prior art and to overcome the drawbacks inherent therein is provided. The system and method allow an individual to annotate content within a first electronic document and create a second electronic document within which the user-annotated content is stored. The annotated content is assigned to an identifying aspect by the user, which identifying aspect allows the system and method to automatically organize the annotated content into a specific grouping within the second electronic document based on the indication means used to so annotate it. The user may thereafter reorganize the annotated content within the second electronic document as desired.

In an embodiment, a method for annotating, outputting, and organizing electronic content comprises the steps of receiving a first electronic document, loading the first electronic document into a storage medium, generating a second electronic document, allowing a user to produce at least one annotation onto the first electronic document using at least one indication means, outputting the at least one annotation to the second electronic document, and organizing the at least one annotation within at least one grouping in the second electronic document. The method further allows the user to define the at least one indication means used to produce the at least one annotation and to correspond a user-defined identifying aspect to the at least one indication means. The method further corresponds the at least one grouping in the second electronic document to at most one identifying aspect, which provides for user control over the organization of the annotated content stored therein.

In a further embodiment, each at least one indication means may only correspond to at most one identifying aspect and identifying aspect may only correspond to at most one indication means.

In a further embodiment, the user may manipulate the at least one annotation once it is stored in the second electronic document.

In a further embodiment, the user may manipulate the first electronic document in a variety of ways, including underlining, italicizing, bolding, striking, highlighting, coloring, circling, and free-hand drawing.

In a further embodiment, the user may associate identifiers to the second electronic document.

In an embodiment, a system for annotating, outputting, and organizing electronic content comprises a computer readable medium, an input means, a processor, and a display module. The computer readable medium stores a first electronic document and a second electronic document and provides a file browser included therein. The input means may be any input device for allowing a user to manipulate the first and second electronic documents, as well as the file browser. The processor executes various routines for recognizing the input means, identifying at least one annotation made to the first electronic document, relating the at least one annotation to a user-defined identifying aspect, reproducing the at least one annotation within the second electronic document, and organizing the at least one annotation within the second electronic document based on the identifying aspect related thereto. The display module may be any display device for displaying the first and second electronic documents, as well as the file browser.

In a further embodiment, the processor executes a document editor subroutine, which loads the first electronic document onto the display module, generates the second electronic document, allows the user to produce at least one annotation on the first electronic document and to otherwise manipulate such document in a variety of ways, and thereafter stores the at least one annotation on the computer readable medium.

In a further embodiment, the processor executes a document organizer subroutine, which loads the second electronic document onto the display module, receives the at least one annotation stored on the computer readable medium, and organizes the at least one annotation in the second electronic document within at least one grouping defined by the identifying aspect corresponding thereto.

In a further embodiment, the processor allows the user to define an indication means for graphically representing the at least one annotation within the first and second electronic documents.

In an embodiment, a computer program product for annotating, outputting, and organizing electronic content comprises a program module having instructions for receiving a first electronic document, loading the first electronic document into a storage medium, generating a second electronic document, allowing a user to produce at least one annotation onto the first electronic document using at least one indication means, outputting the at least one annotation to the second electronic document, and organizing the at least one annotation within at least one grouping in the second electronic document. The instructions further allow the user to define the at least one indication means used to produce the at least one annotation and to correspond a user-defined identifying aspect to the at least one indication means, which identifying aspect may only correspond to the one indication means corresponding thereto. The instructions further correspond the at least one grouping in the second electronic document to at most one identifying aspect. The instructions further limit the at least one indication means to only correspond to at most one identifying aspect.

In a further embodiment, the method further comprises the step of and the program module of the computer program product further comprises instructions for reproducing the at least one annotation from the first electronic document, which reproduced annotation is what is outputted to and stored within the second electronic document such that the original annotation remains stored within the first electronic document.

In a further embodiment, the method, system, and computer program product further comprise a file browser that is managed by the user and that stores the first and second electronic documents, which file browser is capable of maintaining as many first and second electronic documents as may be stored in the computer's storage medium.

In a further embodiment, the system further comprises and the program module of the computer program product further comprises instructions for a client-server protocol for communicating data between a remote database and the computer readable medium.

In a further embodiment, the at least one indication means of the method and computer program product and the indication means of the system each comprise a highlight color defined by the user.

These together with other aspects of the present disclosure, along with the various features of novelty that characterize the present disclosure, are pointed out with particularity in the claims annexed hereto and form a part of the present disclosure. For a better understanding of the present disclosure, its operating advantages, and the specific objects attained by its uses, reference should be made to the accompanying drawings and detailed description in which there are illustrated and described exemplary embodiments of the present disclosure.

DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

Figure 1:
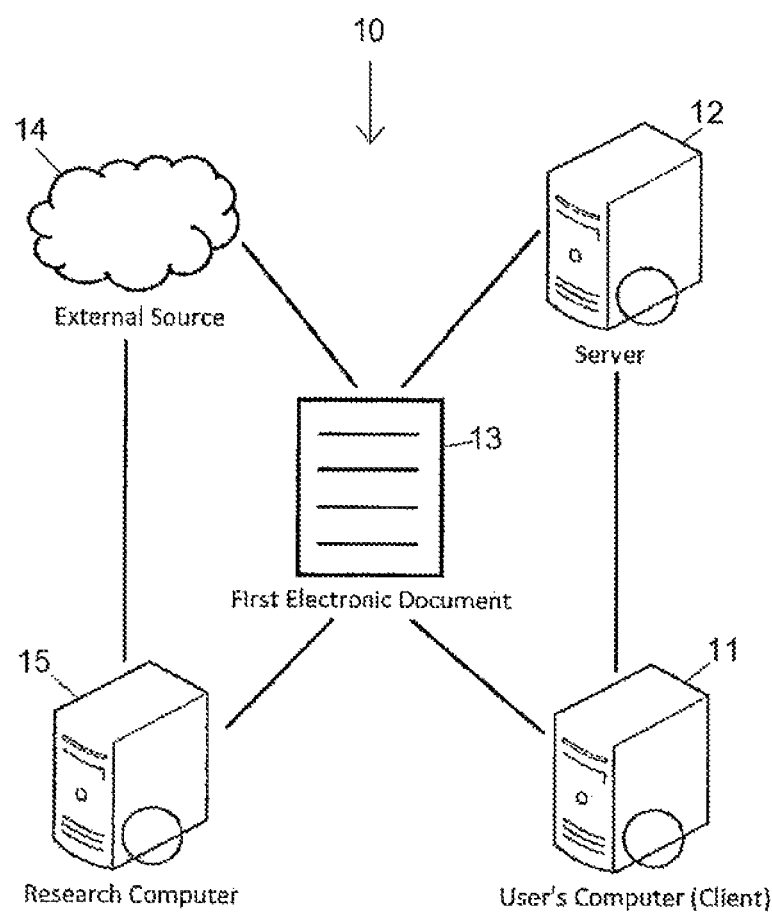
FIG. 1 shows an exemplary diagram of the connections between the various computer systems involved in the disclosed method in accordance with an exemplary embodiment of the present disclosure.

The best mode for carrying out the present disclosure is presented in terms of its preferred embodiments, herein depicted in the accompanying figures. The preferred embodiments described herein detail for illustrative purposes are subject to many variations. It is understood that various omissions and substitutions of equivalents are contemplated as circumstances may suggest or render expedient, but are intended to cover the application or implementation without departing from the spirit or scope of the present disclosure.

The terms "a" and "an" herein do not denote a limitation of quantity, but rather denote the presence of at least one of the referenced items.

The present disclosure comprises a system and method for annotating and manipulating electronic documents. In an embodiment, a computer-implemented method for outputting and organizing user-annotated content allows a user to load a first electronic document, annotate the first electronic document, and output the annotations to a pre-generated second electronic document. The first electronic document is received by the computer implementing the method and may be received from a remote source, such as a website or remote server. The first electronic document is then loaded into the storage medium of the computer and opened within a program thereon capable of opening such an electronic file. The second electronic document is generated thereafter and, once annotations are made to the first electronic document, the annotations are outputted thereto, where they are organized into a specific grouping defined within a particularized area of the second electronic document.

The method provides a plurality of indication means that the user can associate with an identifying aspect, which association categorizes each annotated content item within the specific grouping corresponding to the indication means used to annotate such content item. In a preferred embodiment, the indication means is a plurality of highlight colors and the identifying aspect is a content category. The user defines the association between each highlight color and its corresponding content category before annotating the first electronic document. The second electronic document then automatically organizes the annotated content therein based on the highlight color used and groups all similarly-annotated content items together for easy perusal. The user may thereafter reorganize the annotated content within the second electronic document as desired. In a further embodiment, the indication means is a plurality of orthographic conventions.

In an embodiment, a system for allowing a user to produce an annotation within a first electronic document and subsequently output it to and organize it within a second electronic document comprises a computer readable medium, an input means, a processor, and a display module. The system stores the first and second electronic documents until they are loaded for use on the display module by the processor. The processor executes a document editor subroutine that allows the user to annotate and otherwise manipulate the first electronic document, and thereafter executes a document organizer subroutine that generates the second electronic document and outputs and organizes the annotations previously made thereto and therein. In essence, the system is a computer hardware configuration capable of running a software application comprising program code for executing the disclosed method.

The present disclosure further comprises a computer program product embodied on a storage medium for outputting and organizing user-annotated content from a first electronic document to a second electronic document. In an embodiment, the computer program product comprises a program module having instructions for executing the disclosed method on the computer on which the computer program is installed, including instructions for receiving the first electronic document from some source, loading it into the storage medium of the computer, generating the second electronic document, allowing the user to annotate the first electronic document using a set of pre-defined indication means, outputting the annotations to the second electronic document, and organizing them therein based on the indication means used to so annotate them.

In a preferred embodiment, the disclosed computer program product relates to a software application (hereinafter referred to as the "application") capable of being executed on the disclosed computer system, which application comprises the steps of the disclosed method. The application generates a second electronic document for receiving specific, user-selected content from a separate, first electronic document, which content may be text, images, or other forms. Specifically, the application allows the user to annotate selected content from the first electronic document using a plurality of highlight colors and/or orthographic conventions, wherein each highlight color and/or orthographic convention has been associated with a content category. The content that is received by and stored within the second electronic document is automatically organized into content categories based on the user's pre-defined associations with the highlight color and/or orthographic convention used to annotate such content. The user may thereafter reorganize the annotated content items within the second electronic document as desired. In this way, the user is able to greatly reduce the amount of time spent on transposing such content manually from the first electronic document to the second electronic document.

For example, the application may be used by a law student to help with briefing cases. Law students are generally required to read significant quantities of court opinions (colloquially referred to as "cases") in connection with their studies, and they often brief these cases, which briefs comprise the important information from such court opinions in order to help them succinctly isolate (and, ideally, comprehend) the details thereof. Thus, a law student using this application would be able to download an electronic file comprising a case opinion and highlight it using a variety of colors with each color pertaining to a separate category of information (for instance, he or she might use the yellow highlight color to annotate the facts of the case and the orange highlight color to annotate the rules of law set forth by the court). The second electronic document would resultingly include groupings, each of which comprising a content category (e.g. "Facts" and "Rules") and every line of text from the opinion that was annotated using the highlight color corresponding to that content category.

Similarly, and as another example, the application may be used by an actor, playwright, or other individual involved in an entertainment production to help with keeping track of each character's lines. Scripts are generally very long and provide few unique details for identifying one character from another aside from the plain text prescribing the characters' names. It is often desirable to have a separate listing of each individual character's lines, for example, to better understand that character's development and progression throughout the course of the production's story. As such, the user would be able to download an electronic file comprising a script and highlight it using a variety of colors with each color pertaining to a different character. The second electronic document would thus include groupings, each of which comprising a content category (e.g. "Character 1's Lines") and every line from the script that was annotated using the highlight color corresponding to that content category.

Additionally, the application has further uses than those discussed above. Because the application may be used to annotate items other than text, such as images, graphs, and charts, a user may be able to create a second electronic document such as a summary of a scientific journal article, a corporate business report, and a sketchbook of drawings and designs. The application can work with a variety of forms of electronic documents, including those embodied in PDF, DOC, HTML, and other formats, and memory sizes as large as that which can be stored on the computer readable medium of the computer system running the application.

Referring now to FIG. 1, a diagram 10 is shown as indicating the connections between the user's computer 11 and the various other computers 15 and servers 12 involved in the disclosed method. Before the first electronic document 13 can be received by the user's computer 11, it must be located elsewhere and transmitted thereto. The user will thus be required to find the first electronic document 13 from some external source 14, which may be another computer or a website. In an embodiment where the method is used to generate a case brief for a court opinion, the first electronic document 13 may be a court opinion and may come from a legal database website. The user would log on to one of those websites, perform research related to his or her subjects of study, and uncover one or more court opinions that may be of interest to him or her. In a further embodiment where the method is used to generate a listing of lines based on the characters in a play or movie, the first electronic document 13 may be a script derived from a script database website, studio office, or other location.

In an embodiment, the user may subsequently download the court opinions, scripts, or other electronic documents to the storage medium of the local computer 15 upon which the research was performed and email them to an individualized email address as an attachment thereto. This email address is provided to the user upon his or her initially creating an account with the application and directs all incoming messages to a server 12 that maintains the user's information such as his or her account data, settings, and files maintained in the application's library. Once the user is back on his or her own computer 11, also known as the client computer, he or she may log into the application using his or her username and password. The application connects directly to the server 12 on which the email message and attachments are maintained, and any documents provided by the user for use with the application are automatically received within the file browser upon the application loading in the computer's 11 memory. In an embodiment, the attachments may only remain within the inbox for a limited duration, which duration, in an embodiment, is fourteen days, after which time the user would be required to re-download such attached electronic documents. In a further embodiment, the user may manually import the first electronic document 13 into the file browser. Once downloaded to the application's library, the first electronic document 13 is considered received.

The figure further illustrates the ability of the application to be executed in one of two different computing environments. First, and in a preferred embodiment, the application is run on a local computer system 11 managed and possessed by the user, for instance, on the user's tablet computer or laptop. In this way, the processor of the user's computer system 11 will execute the application and related subroutines and the storage medium thereof will maintain and store all files associated with the application. In a further embodiment, the application runs on a server 12 managed remotely and located at a remote location, and the user connects their computer system 11 to such server 12 in order to gain access to the application and associated data.

Figure 2A:
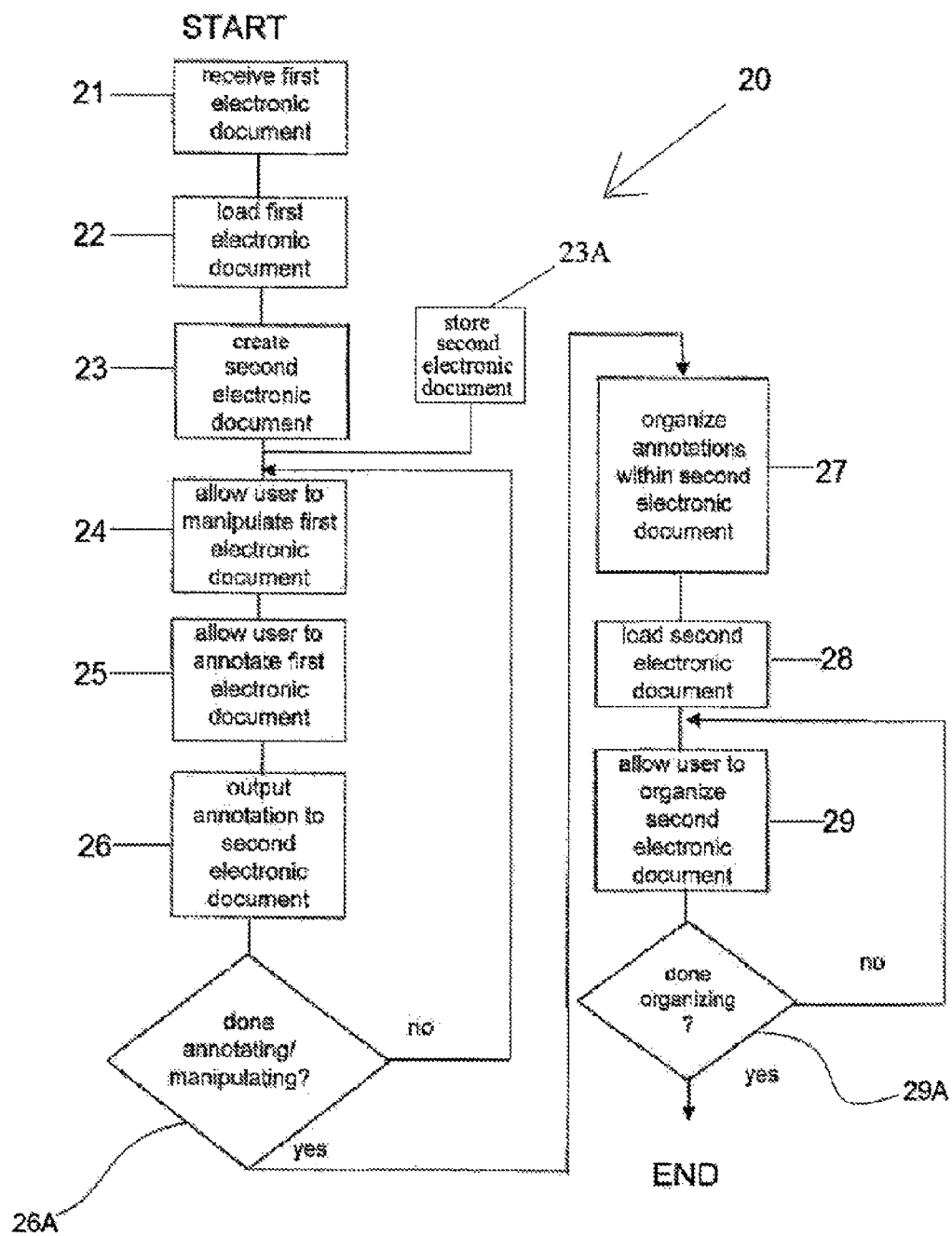
FIG. 2A shows an exemplary flow chart illustrating the steps of the disclosed method in accordance with an exemplary embodiment of the present disclosure.

The flow chart of FIG. 2A depicts the process 20 by which the user annotates the first electronic document using the application. As is shown, the first step is the receiving step 21, which, as discussed above, requires the user to receive the first electronic document within the application from some source. After it is received, the user may select the first electronic document from the application's file browser to load it 22 onto the display of the computer running the application. The first electronic document, once loaded, may be viewed by the user as it would be had it been loaded by a standard program capable of opening such a file. The user may then choose to exit from the first electronic document and return to the file browser, or to select an editing tool provided on the display. Selecting the editing tool executes a document editor subroutine, which allows the user to annotate and otherwise manipulate the first electronic document.

The document editor subroutine initially and automatically generates the second electronic document upon being executed 23, which second electronic document is saved to the memory of the computer running the application 23A and is configured to receive the annotations made to the first electronic document, as discussed below. The second electronic document may initially be stored within the same file folder as contains such first electronic document and may thereafter be moved or otherwise reorganized by the user to a different location in the file browser.

Figure 2B:
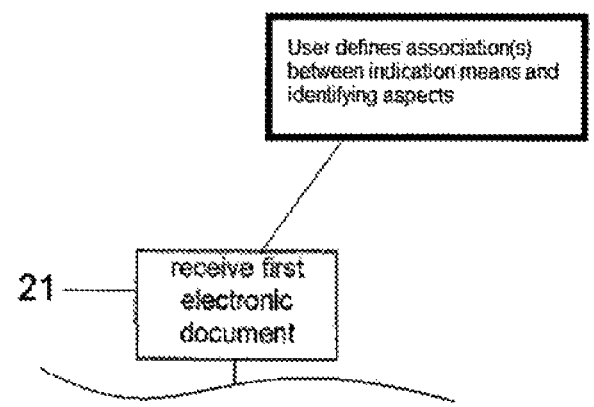
FIG. 2B shows a user being able to define associations between indication means and identifying aspects before receiving a first electronic document, in accordance with an exemplary embodiment of the present disclosure.

The document editor subroutine provides the user with a variety of options for annotating 25 and otherwise manipulating 24 the content of the first electronic document. Specifically, a plurality of indication means may be offered to the user for annotating specific portions of the document that are of interest to him or her. In an embodiment, the plurality of indication means is a set of highlight colors from which the user may select one color at a time to highlight specific lines of text, images, or other content items. The plurality of highlight colors is provided such that each highlight color may be used with a particular identifying aspect, which, in an embodiment, is a content category. The user may define the associations (as shown in FIG. 2B) between the highlight colors and the content categories prior to annotating the first electronic document by entering the settings menu, which menu is accessible at least via the file browser. In an embodiment, nine highlight colors may be provided for the user to correspond to various content categories.

In an embodiment, the application allows the user to associate multiple highlight colors with a single content category and/or multiple content categories with a single highlight color. For example, where the first electronic document is a court opinion, the user may define the highlight colors yellow and orange to correspond to the content category "Facts," or he or she may define the highlight color yellow to correspond to the content categories "Facts" and "Rules." However, in a preferred embodiment, the method will allow the user to associate only a single highlight color with a single content category. For example, in a preferred embodiment where the first electronic document is a court opinion and where the user defines the highlight color yellow to correspond to the content category "Facts," he or she may not use any other highlight colors with the content category "Facts," nor use the highlight color yellow with any other content categories. In an embodiment, the user will be able to define these associations within the settings menu of the application.

In another embodiment, the indication means is a user-defined orthographic convention (such as the italicization, bolding, or underlining of text), which orthographic convention may correspond to a content category such that when the user selects and applies the orthographic convention to a portion of text in the first electronic document for annotating that portion of such document, the method, system, and computer program product of the present disclosure will deposit that portion of the text to which the particular orthographic convention has been applied to the particular content category of the second electronic document that corresponds thereto. It will be apparent that the user may employ a plurality of different orthographic conventions to the first electronic documents, each of which different orthographic conventions having a particular content category associated therewith.

While using the document editor subroutine, the user may undertake a variety of actions, including, but not limited to, annotating select content from the first electronic document with the highlight colors; underlining, italicizing, bolding, and striking text; and free-hand drawing thereupon. In an embodiment, the application may provide an undo feature, which undo feature when used would effectively erase any recently added annotations or manipulations made to the first electronic document. In an embodiment, the computer running the application will feature a touch-based input means, such as a touch screen, which will thereby allow the user to directly apply an annotation or manipulation to the specific content of the first electronic document. In a further embodiment, the input means may be a keyboard and mouse configuration. It will be apparent that document editor subroutine may allow the user to manipulate the first electronic document using the input means, which input means may provide the user with the ability to draw on or otherwise produce illustrations and graphics within the first electronic document as desired.

In an embodiment, certain document manipulations such as the free-hand drawing onto content will be maintained solely within the first electronic document. Contrastingly, annotations made to the first electronic document using the set of pre-defined highlight colors and/or orthographic conventions will be outputted to the second electronic document. In an embodiment, the annotations themselves will be outputted 26 to the second electronic document and will thus be removed from the first electronic document and stored only within the second electronic document. In a further embodiment, a copy of the annotations will be outputted 26 to the second electronic document, thereby maintaining the original annotations within the first electronic document and storing the copy thereof within the second electronic document.

Once the user is finished annotating and manipulating the first electronic document at 26A, the application may close the document editor subroutine and execute a document organizer subroutine. The document organizer subroutine may organize the content 27 into a plurality of groupings, each of which corresponding to a single content category. The application may automatically organize the annotated content into the appropriate content category based on the user-defined associations between them that were defined before the annotations were made. For example, in an embodiment where the annotated content is text and the first electronic document is a court opinion, where the user defined the highlight color yellow to pertain to the content category "Facts" and the highlight color orange to pertain to the category "Rules," any text annotated within the first electronic document using the yellow highlight color would be placed within the "Facts" grouping within the second electronic document, and any text highlighted in orange would be placed within the "Rules" grouping therein.

In an embodiment, the document organizer subroutine will order the annotations of a particular grouping based on the order in which they appear in the first electronic document. In a further embodiment, the document organizer subroutine will order the annotations of a particular grouping based on the order in which they are annotated by the user. In a further embodiment, and where the annotated content is text, the document organizer subroutine will order the annotations of a particular grouping alphabetically based on the first letter of the first word of each annotated content item. Once the annotations have been organized by the document organizer subroutine, the application will load the second electronic document 28 onto the display of the computer running the application.

Although the method may automatically organize the annotated content into the associated categories, the user may thereafter reorganize the annotated content items 29 stored within the second electronic document as desired by reordering the content items of a particular grouping and/or relocating the content items to a different grouping therein. The user may also assign identifiers to the second electronic document in order to more easily identify such document within the file browser. For example, where the first electronic document is a court opinion and the second electronic document comprises a brief of that opinion, the user may further label the second electronic document with the name of the case or the parties thereto, the reporter in which the opinion is prescribed, the date of the decision, and other information. Or, where the first electronic document is a script, the user may further label the second electronic document with the title of the production, the names of the actors, and other information. When the user is done organizing or reorganizing 29A, the method ends.

Figure 5:
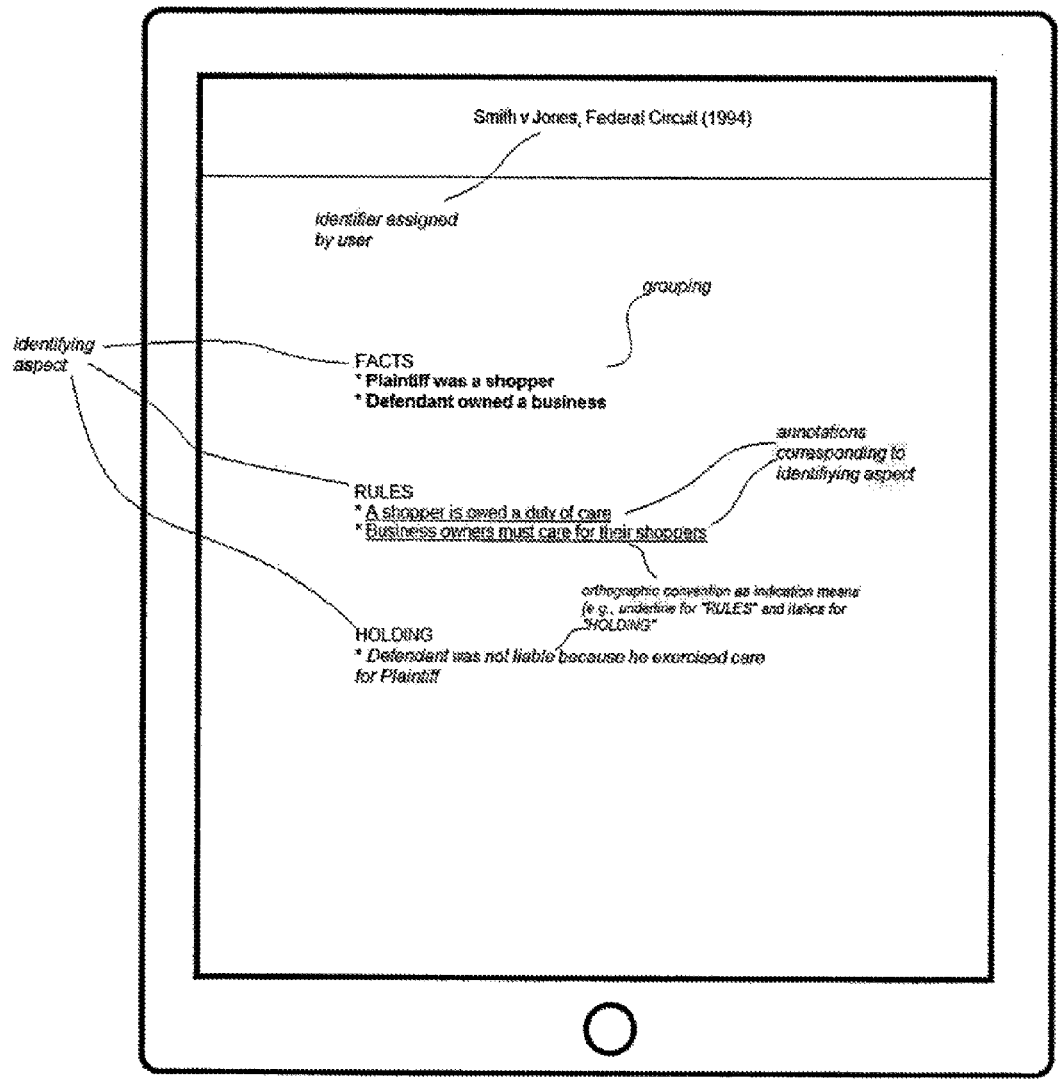
FIG. 5 shows an exemplary second electronic document with identifying aspects, groupings, identifiers assigned by a user, and annotations corresponding to identifying aspects, in accordance with an exemplary embodiment of the present disclosure.

FIG. 5 shows an exemplary secondary electronic document, which exemplary second electronic document includes one indication means having one identifying aspect and vice versa. FIG. 5 also shows annotations reproduced on the second electronic document, manipulated annotations, assigned identifiers, and indication means in the form of orthographic conventions.

The application allows the user to store a plurality of first and second electronic documents within the application's library. As such, the method may be repeated every time a user finds a first electronic document that he or she wants to annotate and is concluded upon the user finalizing his or her additional edits to the second electronic document. The user may store as many first and second electronic documents as may be retained by the computer's memory and may organize each of the files as desired within the file browser of the application.

Figure 3:
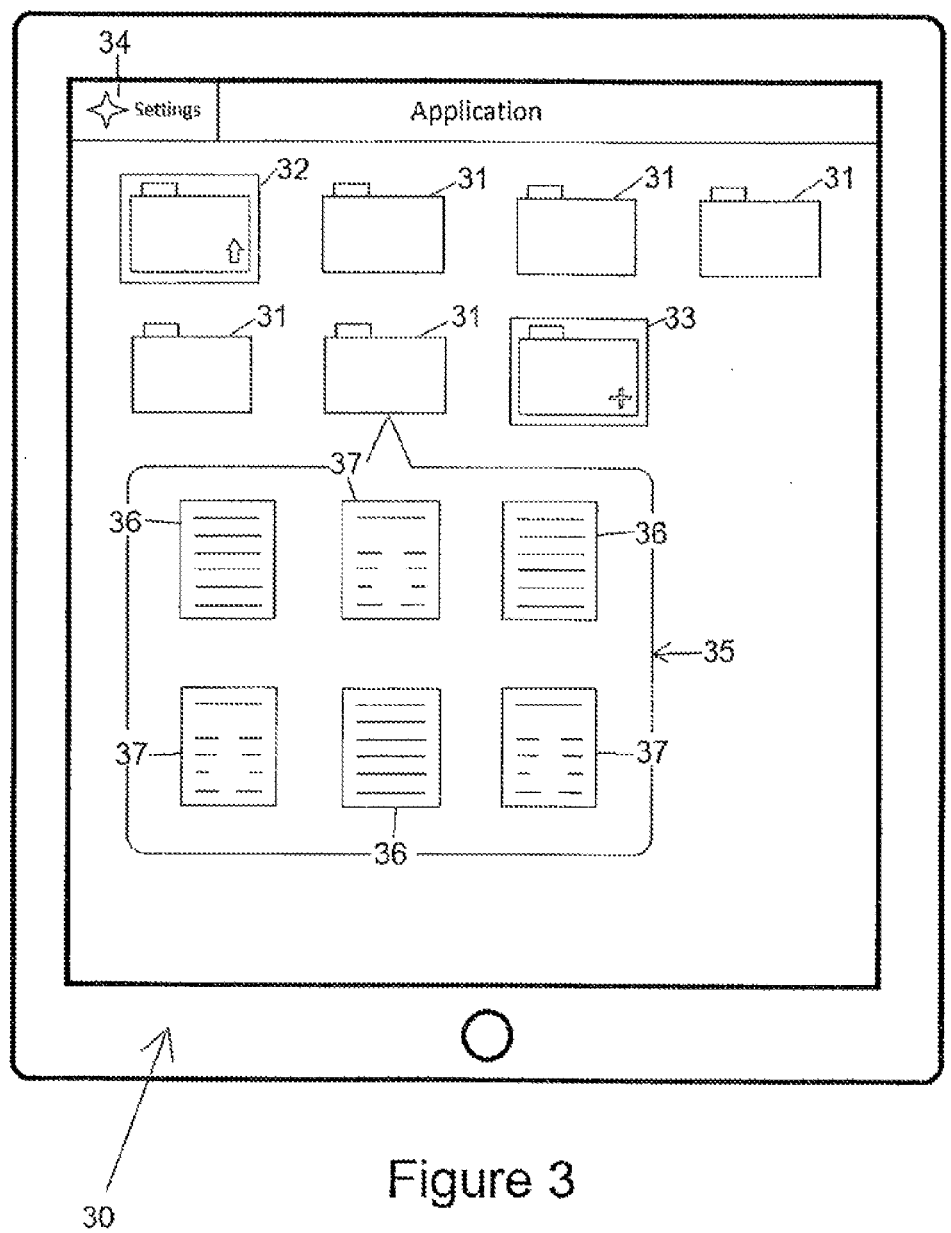
FIG. 3 shows an exemplary user interface of the system and method in accordance with an exemplary embodiment of the present disclosure.

FIG. 3 shows an exemplary screenshot of an application using such file browser 30 wherein the user may store and organize their first electronic documents 36 and second electronic documents 37. The main screen for the file browser 30 shows at least one file folder 31 capable of organizing and storing a plurality of first electronic documents 36 and second electronic documents 37, an inbox folder 32, an icon for creating a new file folder 33, and a settings menu icon 34 for accessing the settings and other options of the application. The inbox folder 32 will be the location to which the first electronic documents 36 are sent by and received from the source of such electronic document. The user may remove the received first electronic documents 36 from the inbox folder 32 and move them into a file folder 31 to organize them as desired. The user may create as many file folders 31 as he or she likes to organize and store the first and second electronic documents by selecting the aforementioned new folder icon 33. Selecting a file folder 31 from the file browser 30 causes a pop-up window 35 to appear on the display, which window 35 will display the contents of the selected file folder 31 in an organized way. The first electronic documents 36 and second electronic documents 37 stored therein may originally be organized alphabetically, and the user may thereafter rename the files and otherwise reorganize them as desired.

When the application is first loaded by the user, it will prompt the user for authentication information such as a username and a password. The user will have to either enter his or her username and password to authenticate their account information and log in, or opt to create a new account if he or she has not already so done. There may further be an option for help with a lost or forgotten username and/or password so that the user may reset his or her account information. Once the application has authenticated the user, the user is logged into his or her account and directed to the file browser 30. The file browser 30 is the main screen used by the user and the first one seen by the user after logging into the application. In an embodiment, the file browser 30 may provide the user with customization options for further personalizing the file browser 30. These customization options may include altering the color or other appearance features of the background and foreground items and/or renaming the existing file folders 31.

In a preferred embodiment, the user's account and all data associated therewith, including all first and second electronic documents and settings, are stored locally on the computer that is running the application. In this way, the authentication device is used solely to securely protect the user's account and associated data. In a further embodiment, the user's account and all data associated therewith are stored on a remote server or a computer other than that being used by the user to access the application. In this way, the authentication device not only securely protects the user's account and associated data, but also provides a remote connection to the server on which such account and associated data are stored and maintained.

Figure 4A:
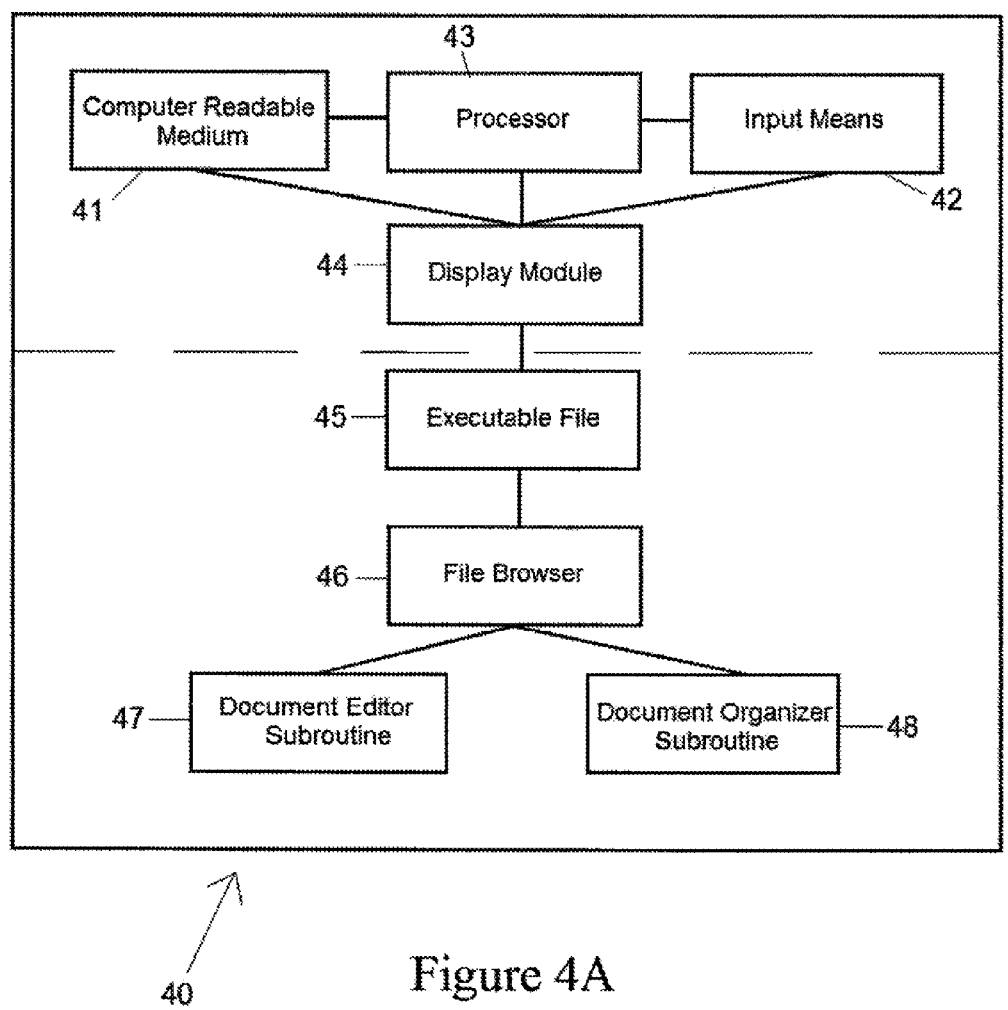
FIG. 4A shows an exemplary computer system diagrammed hierarchically in table view in accordance with an exemplary embodiment of the present disclosure.

A system capable of running the disclosed method is diagrammed in FIG. 4A, which diagram illustrates the various components of such system 40 and indicates their relation to one another. The system 40 is a computer and therefore must comprise at least a computer readable medium 41, an input means 42, a processor 43, and a display module 44. The processor 43 is capable of executing commands and other various programs and routines, and performs any calculations that are necessary to communicate any information that may need to be transmitted between it and the other components of the system. The computer readable medium 41 may be a random access memory, or RAM, capable of loading various programs and other routines to be executed by the processor 43 for use by the user. The computer readable medium 41 may also be a read-only memory, or ROM, such as a hard drive, capable of storing quantities of information thereon for use by the user throughout the execution of various programs and other routines.

The input means 42 comprises a means for allowing the user to interact and otherwise cause changes to occur within the software environments of the computer. In a preferred embodiment, the input means 42 is touch-based, which allows the user to annotate and select content using their fingers and thus do so without the need of extraneous accessories. In a further embodiment, the input means 42 may be a keyboard and mouse combination that is operatively coupled with the computer system via wired or wireless connections. The display module 44 may be any screen for viewing the user interfaces embodied by the programs and other routines being executed by the processor 43. In a preferred embodiment wherein the input means 42 is touch-based, the display module 44 is a touch screen. In a further embodiment, the display module 44 may be a computer monitor, television, projector, or other viewing device.

Figure 4B:
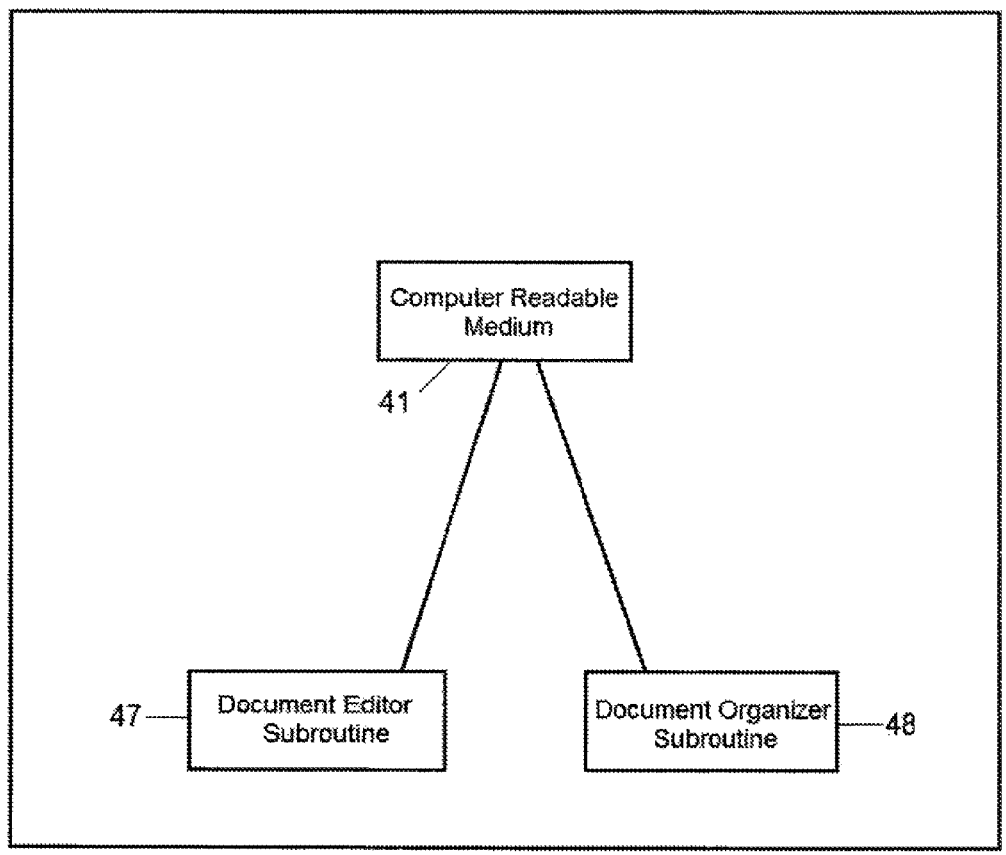
FIG. 4B shows an outputting of at least one annotation to be store on a computer readable medium, in accordance with an exemplary embodiment of the present disclosure.

When the user causes the computer system 40 to open the application, the processor 43 executes an executable file 45 for running it and the application is brought to the front of the display module 44. The user will enter their login information to gain access to the file browser 46, which file browser 46 will provide an organized way to view and maintain all of the electronic documents constituting the user's library of content. When the user begins the disclosed method by loading the first electronic document into the computer readable medium 41, the processor 43 executes a document editor subroutine 47 that allows the user to annotate and otherwise manipulate the first electronic document as desired. For example, the user may underline, italicize, bold, strike, or highlight any text; color or circle any image, chart, or graph; and free hand draw anything thereon. The document editor subroutine 47 will store all of the annotations made to the first electronic document in the system's memory 41 (as shown in FIG. 4B) for a transitory duration until the annotations are outputted to and stored permanently within the second electronic document.

The document editor subroutine 47 initially loads the first electronic document onto the display module 44 of the computer system 40 and immediately thereafter generates the second electronic document, which second electronic document receives the outputted annotations. Once the user has finished annotating and manipulating the first electronic document, the processor 43 closes the document editor subroutine 47 and executes a document organizer subroutine 48. The document organizer subroutine 48 receives the annotations that are stored transitorily within the system's memory 41 therefrom and creates a plurality of groupings, each of which representing a single content category to which the annotations pertain. The document organizer subroutine 48 then determines the appropriate groupings to which each of the annotations pertains and places each within its respective grouping. In an embodiment, the document organizer subroutine 48 will not create a grouping for a particular content category if the user does not make any annotations within the first electronic document using an indication means pertaining to that content category.

For example, where the first electronic document is a court opinion, if the document organizer subroutine 48 receives text that was annotated using the yellow highlight color and such highlight color corresponds to the "Facts" content category, the document organizer subroutine 48 will organize that text under the "Facts" grouping of the second electronic document; however, and in the embodiment discussed above, if the user does not use the yellow highlight color to annotate any content within the first electronic document, there will be no grouping for "Facts" within the second electronic document. Additionally, in an embodiment, the document organizer subroutine 48 will order the annotations of a particular grouping based on the order in which they appear in the first electronic document. In a further embodiment, the document organizer subroutine 48 will order the annotations of a particular grouping based on the order in which they are annotated by the user. In a further embodiment, and where the annotated content is text, the document organizer subroutine 48 will order the annotations of a particular grouping alphabetically based on the first letter of the first word of each annotated content item.

Once all of the outputted annotations have been received by the document organizer subroutine 48 and organized within the second electronic document at their respective locations, the document organizer subroutine 48 loads the second electronic document onto the display module 44. This allows the user to view the second electronic document to verify that all of the desired annotations were made to the first electronic document and are organized properly therein. The user may also thereafter re-organize the annotations within the second electronic document should they desire to do so, for example, if he or she decides that an annotated content item listed under a particular grouping should instead be listed under a different grouping or if an annotated content item should be ordered before or after another within its current grouping.

As stated above, and in a preferred embodiment, the application itself is run on a local computer system that is managed and possessed by the user, for instance, on the user's tablet computer or laptop. In this way, the processor of the user's computer system will execute the application and related subroutines and the storage medium thereof will maintain and store all files associated with the application. In a further embodiment, the application itself is run on a remote server that is managed remotely and located at a remote location, and the user merely connects his or her computer system to such remote server in order to gain access to the application. In this way, which is often referred to as "cloud computing," the processor of the remote server executes the application and related subroutines and the storage medium thereof maintains and stores all associated files, meaning that the user's computer system's processor merely must execute a link to connect the user's computer system with the remote server and thus that the user's computer system's storage medium need not maintain or store the associated files.

The system and method disclosed herein provide various advantages over the prior art. A user thereof may receive a first electronic document from some source, load it into the storage medium of a computer system, and produce annotations thereon and otherwise manipulate it in a variety of ways. Meanwhile, the system and method generates a second electronic document for receiving the user-produced annotations, which annotations are outputted thereto from the first electronic document. The annotations are automatically organized within the second electronic document based on the indication means used to so annotate and the identifying aspect that has been pre-defined to correspond to such indication means. The user may thereafter further organize the annotations within the second electronic document as desired.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the disclosure and various embodiments with various modifications as are suited to the particular use contemplated.

What is claimed is:

1. A computer-implemented method for outputting and organizing user-annotated content from a first electronic document to a second electronic document, said method comprising the steps of:

receiving the first electronic document, wherein the first electronic document comprises one or more content items;

loading the first electronic document into a computer readable medium;

creating a new blank electronic document, the blank new electronic document comprising the second electronic document, which second electronic document is capable of receiving content from the first electronic document;

storing the second electronic document within the computer readable medium;

allowing a user to produce at least one annotation by using at least one indication means that is applied to the one or more content items within the first electronic document, which said at least one indication means is selected by the user from a plurality of indication means comprising at least one of underlining, italicizing, bolding, striking, highlighting, coloring, circling, and free-hand drawing;

in response to the user producing the at least one annotation, automatically and without further user intervention, outputting only the at least one annotation from the first electronic document directly to the second electronic document to generate content within the second electronic document; and organizing the at least one annotation outputted to the second electronic document within at least one grouping, wherein the user may associate the at least one indication means of the plurality of indication means with a user-associated content category, and wherein each at least one grouping corresponds to at most one user-associated content category and each at least one grouping contains each at least one annotation corresponding to the user-associated content category corresponding thereto, and wherein the at least one grouping comprises the user-associated content category and at least one of the at least one annotation corresponding thereto, and wherein the second electronic document displays the at least one outputted annotation with or without its associated indication means.

2. The method as claimed in claim 1, wherein each at least one indication means has at most one user-associated content category corresponding thereto and each user associated content category has at most one indication means corresponding thereto.

3. The method as claimed in claim 1, wherein said allowing step further comprises the step of reproducing the at least one annotation from the first electronic document and said outputting step further comprises the step of outputting the reproduced at least one annotation to the second electronic document.

4. The method as claimed in claim 1, wherein the user may manipulate the at least one annotation within the second electronic document by moving the at least one annotation within a grouping of the at least one grouping or by moving the at least one annotation from a first grouping of the at least one grouping to a second grouping of the at least one grouping.

5. The method as claimed in claim 1, wherein the first electronic document and the second electronic document are stored within a file browser managed by the user, the file browser capable of storing a plurality of first electronic documents and a plurality of second electronic documents.

6. The method as claimed in claim 1, wherein the user may manipulate the first electronic document by at least one of underlining, italicizing, bolding, striking, highlighting, coloring, circling, and free-hand drawing, which said manipulation to the first electronic document remains unless the manipulation is removed from the first electronic document by the user.

7. The method as claimed in claim 1, wherein the user may assign at least one identifier to the second electronic document, which said at least one identifier corresponds to a name or other identifying information of the second electronic document.

8. A computer program product embodied on a non-transitory storage medium for outputting and organizing user-annotated content from a first electronic document to a second electronic document, said computer program product comprising a program module having instructions for:
receiving said first electronic document, wherein said first electronic document comprises one or more content items;
loading said first electronic document into said non-transitory computer readable medium;
creating a new blank electronic document, said new blank electronic document comprising said second electronic document, which second electronic document is capable of receiving content from said first electronic document;
storing said second electronic document within said non-transitory computer readable medium;
allowing a user to produce at least one annotation by using at least one indication means that is applied to the one or more content items within said first electronic document, which said at least one indication means is selected by the user from a plurality of indication means comprising at least one of underlining, italicizing, bolding, striking, highlighting, coloring, circling, and free-hand drawing;
in response to the user producing said at least one annotation, automatically and without further user intervention, outputting only said at least one annotation from said first electronic document directly to said second electronic document to generate content within said second electronic document; and
organizing said at least one annotation outputted to said second electronic document within at least one grouping,
wherein the user may associate said at least one indication means of said plurality of indication means with a user-associated content category, and
wherein each said at least one indication means has at most one said user-associated content category corresponding thereto and each said user-associated content category has at most one said at least one indication means corresponding thereto, and
wherein each said at least one grouping corresponds to at most one said user-associated content category and each said at least one grouping contains each said at least one annotation corresponding to said user-associated content category corresponding thereto, and
wherein said at least one grouping comprises said user-associated content category and at least one of said at least one annotation corresponding thereto, and
wherein said second electronic document displays said at least one outputted annotation with or without its associated indication means.

9. The computer program product as claimed in claim 8, wherein said computer program product further comprises instructions for reproducing said at least one annotation from said first electronic document and outputting the reproduced said at least one annotation to said second electronic document.

10. The computer program product as claimed in claim 8, wherein said computer program product further comprises instructions for including a file browser on said non-transitory computer readable medium, said file browser comprising at least one folder, said at least one folder capable of storing and organizing said first electronic document and said second electronic document on said non-transitory storage medium, said file browser capable of storing a plurality of first electronic documents and a plurality of second electronic documents on said non-transitory computer readable medium.

11. The computer program product as claimed in claim 8, wherein said computer program product further comprises instructions for a client-server protocol, said client-server protocol having a client side and a server side, said server side comprising a remote database, said client side communicating with said server side to receive data from and store data within said remote database.

12. A system comprising a non-transitory computer readable medium having instructions that when executed by a processor to perform a method comprising the steps of:
receiving a first electronic document, wherein said first electronic document comprises one or more content items;
loading said first electronic document into said non-transitory computer readable medium;
creating a new blank electronic document, said new blank electronic document comprising a second electronic document, which said second electronic document is capable of receiving content from said first electronic document;
storing said second electronic document within said non-transitory computer readable medium;
allowing a user to produce at least one annotation by using at least one indication means that is applied to said one or more content items within said first electronic document, which said at least one indication means is selected by the user from a plurality of indication means comprising at least one of underlining, italicizing, bolding, striking, highlighting, coloring, circling, and freehand drawing;

in response to the user producing said at least one annotation, automatically and without further user intervention, outputting only said at least one annotation from said first electronic document directly to said second electronic document to generate content within said second electronic document; and organizing said at least one annotation outputted to said second electronic document within at least one grouping, wherein the user may associate said at least one indication means of said plurality of indication means with a user-associated content category, and wherein each said at least one grouping corresponds to at most one said user-associated content category and each said at least one grouping contains each said at least one annotation corresponding to said user-associated content category corresponding thereto, and wherein said at least one grouping comprises said user-associated content category and at least one of said at least one annotation corresponding thereto, and wherein said second electronic document displays said at least one outputted annotation with or without its associated indication means.

13. The system as claimed in claim 12, wherein said non-transitory computer readable medium includes a file browser stored thereon, wherein said file browser comprises at least one folder, said at least one folder capable of storing and organizing said first electronic document and said second electronic document on said non-transitory computer readable medium, said file browser capable of storing a plurality of first electronic documents and a plurality of second electronic documents on said non-transitory computer readable medium.

14. The system as claimed in claim 12, wherein said system further comprises a client-server protocol, said client-server protocol having a client side and a server side, said server side comprising a remote database, said client side communicating with said server side to receive data from and store data within said remote database.

15. The system as claimed in claim 12, wherein each said at least one indication means has at most one said user-associated content category corresponding thereto and each said user-associated content category has at most one said at least one indication means corresponding thereto.

16. The system as claimed in claim 12, wherein the user may manipulate said first electronic document by at least one of underlining, italicizing, bolding, striking, highlighting, coloring, circling, and free-hand drawing, which said manipulation to said first electronic document remains unless said manipulation is removed from said first electronic document by the user.

17. The system as claimed in claim 12, wherein the user may assign at least one identifier to said second electronic document, which said at least one identifier corresponds to a name or other identifying information of said second electronic document.

* * * * *